W. A. WARREN.
CONDUIT FOR HIGH TENSION ELECTRIC CURRENTS.
APPLICATION FILED APR. 19, 1905.
1,044,108.
Patented Nov. 12, 1912.
2 SHEETS—SHEET 1.
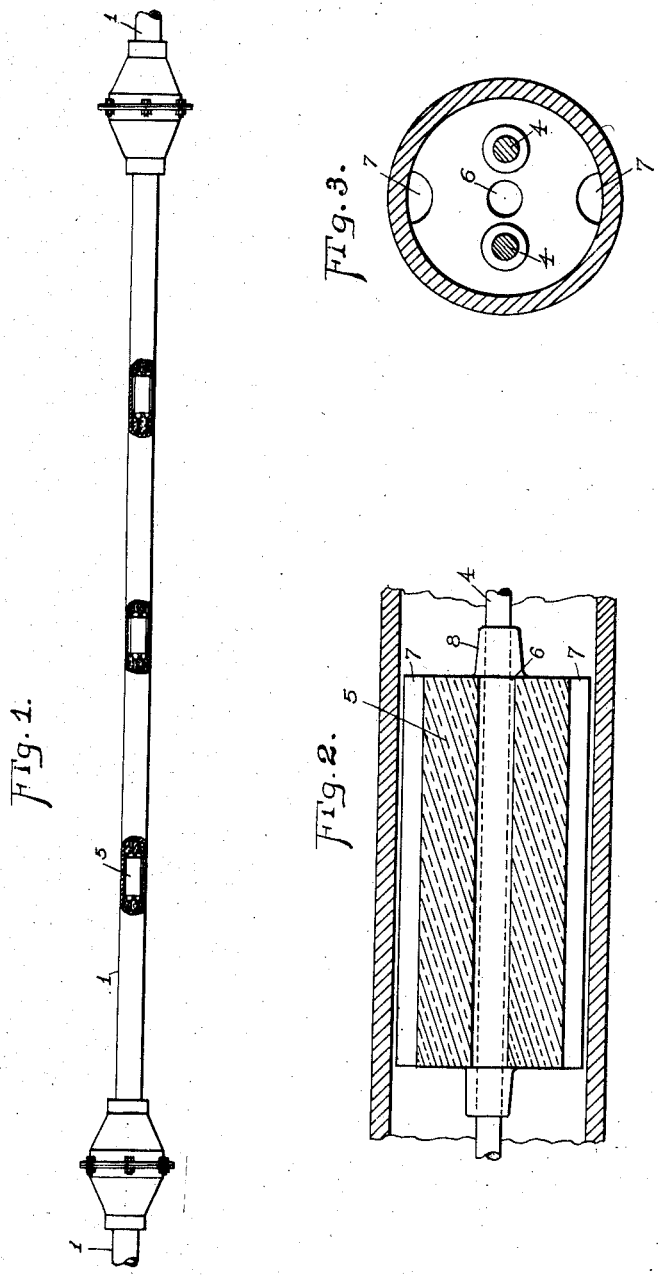
WITNESSES:
Delos Holden
Anna R. Klehm
INVENTOR
William A. Warren
BY
Frank L. Dyer
ATTORNEY W. A. WARREN.
CONDUIT FOR HIGH TENSION ELECTRIC CURRENTS.
APPLICATION FILED APR. 19, 1905.
1,044,108.
Patented Nov. 12, 1912.
2 SHEETS—SHEET 2.
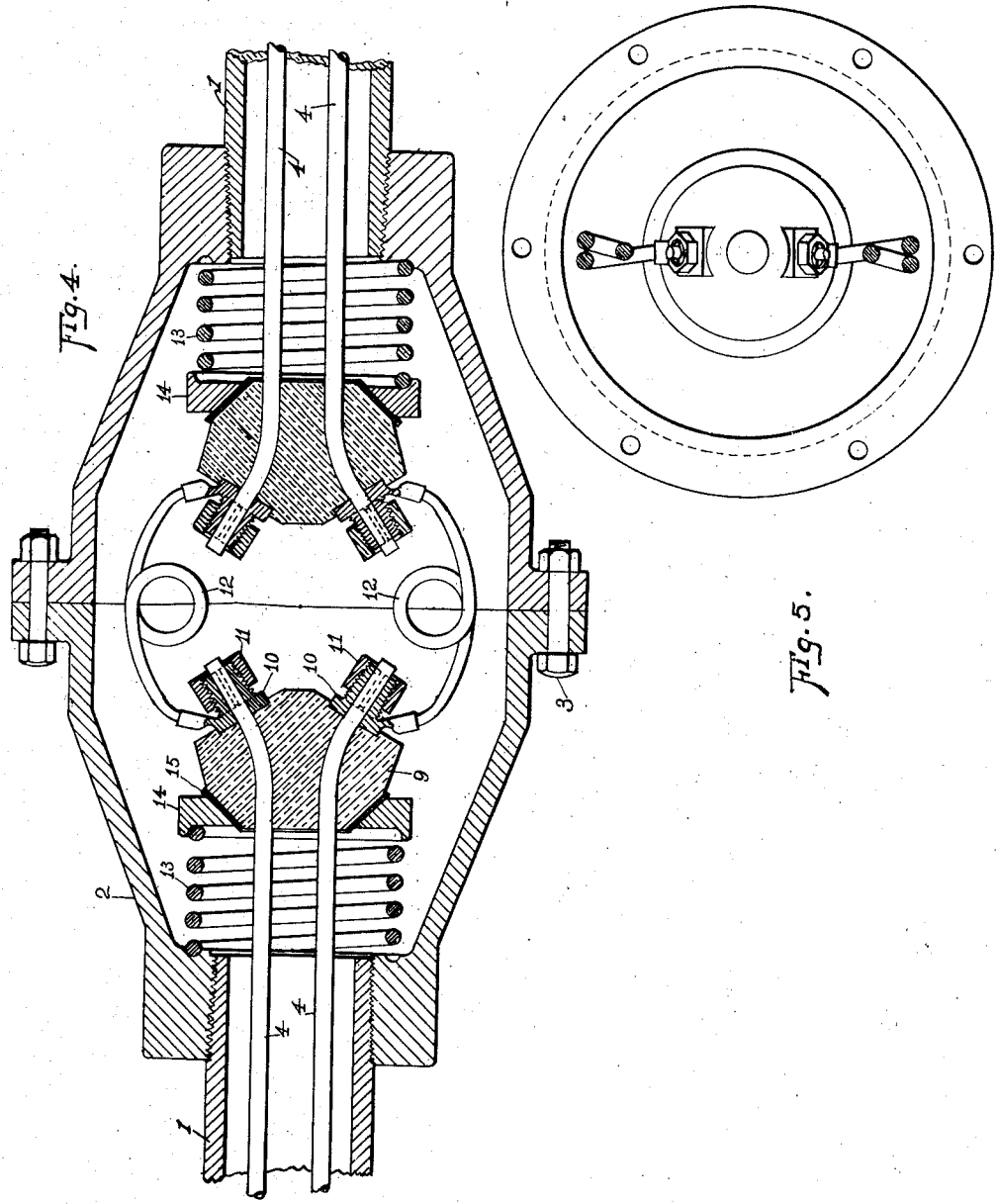
WITNESSES:
INVENTOR
ATTORNEY

UNITED STATES PATENT OFFICE.

WILLIAM A. WARREN, OF HURLEY, NEW YORK.

CONDUIT FOR HIGH-TENSION ELECTRIC CURRENTS.

1,044,108.    Specification of Letters Patent.    Patented Nov. 12, 1912.

Application filed April 19, 1905. Serial No. 256,360.

*To all whom it may concern:*

Be it known that I, WILLIAM APPLETON WARREN, a citizen of the United States, residing at Hurley, Ulster county, New York State, have invented certain new and useful Improvements in Conduits for High-Tension Electric Currents, of which the following is a description.

My invention relates to new and useful improvements in conduits for high tension electric currents, and my object is to provide a conduit of relatively low cost and of high insulating properties.

To this end the invention consists in an inclosed tubular conduit, in which the conductors are supported by means of suitable insulators, the conduit being filled with oil, whereby the insulation will be of very superior character. Preferably, provision is made for maintaining the conductors under constant stress, in order that they may not become slack, with the consequent danger of electric leakage or actual short circuiting.

In order that the invention may be better understood, attention is directed to the accompanying drawings, in which—

Figure 1 is an elevation partly in section of my improved conduit, showing two of the couplings by which the sections are connected together, Fig. 2 an enlarged longitudinal section, showing one of the supporting insulators, Fig. 3 a front elevation of the same, Fig. 4 a longitudinal sectional view through one of the couplings and Fig. 5 a front elevation partly in section of one of the coupling sections looking into the same. In all of the above views corresponding parts are represented by the same numerals of reference.

The conduit consists of tubular sections 1, 1, made preferably of wrought iron, of any suitable size for the purpose, and of any desired length. Each section may be formed of a single pipe or tube, or of a number of pipes secured together by ordinary pipe couplings. Connecting the sections together are couplings 2 made of two sections, as shown, threaded upon the ends of the conduit, and the sections held together by bolts 3. The threaded connections between the coupling 2 and the conduit sections are preferably tapered, as shown, in order to form a liquid tight joint. Mounted within the sections 1 of the conduit are conductors 4, 4 (one or more) which are supported at suitable points by insulators 5 (Figs. 2 and 3). These insulators are made of porcelain, glass, hard rubber, micanite, or any suitable insulating material. Each insulator is preferably formed with a central passage 6, and with longitudinal circumferential passages 7, 7 to permit circulation of oil through the conduit. Since there is a tendency with electric currents of very high tension to creep along insulating surfaces, with which the conductors may be in contact, I prefer to form the insulators with nipples 8, surrounding the conductors, in order that the length of the surfaces between the conductors may be increased, to thereby reduce any tendency of leakage from this cause. The conductors 4 in each section are engaged with insulating blocks 9, made preferably of porcelain, and at their free ends are inserted within threaded tapered bushings 10, the latter being split as shown, and being engaged by nuts 11, by which the bushings will be clamped on the ends of the conductors so as to lock the same firmly in position within the insulating blocks 9. The conductors 4 also pass through the bushings in a curved direction, as shown, so that the ends of the opposing conductors are more widely separated, to permit the bushings to be conveniently secured in place. If desired, each of the couplings may be provided with a suitable manhole (not shown) by which the interior may be reached. The bushings 10, 10 are connected together as shown, by flexible cables 12. In order to maintain the conductors under constant stress so as to accommodate expansion or contraction therein from any cause, I make use of heavy springs 13, engaging metal washers 14, exerting stress on the insulating blocks 9. Preferably a soft packing 15 is introduced between the washers 14 and the blocks 9, in order to secure uniform bearing between the two.

After the parts have been all assembled, the entire inclosed space within the conduit surrounding the conductors 4 is filled with a suitable cheap oil of high dielectric strength, such as petroleum or rosin oil (see Fig. 1) which obviously is free to circulate through the conduit and which may be supplied thereto and maintained constantly therein in any suitable way. The use of oil in the conduit for high tension currents, as explained, enormously improves the insulating character of the latter, so that the diameter of the pipe sections may be comparatively small, whereby the cost of installation will be reduced to a minimum.

Having now described my invention, what I claim as new therein and desire to secure by Letters Patent is as follows:

1. In a conduit for high tension electric currents, the combination with a pipe or tube, conductors therein, an insulating block secured to the end of said conductors, and a spring for imposing stress on said block to maintain the conductors under tension, substantially as set forth.

2. In a conduit for high tension electric currents, the combination with a pipe or tube, a series of conductors therein, an insulating block having outwardly curved passages through which the ends of said conductors are extended, and a spring for imposing stress on the insulating block, whereby the conductors will be maintained under tension, substantially as set forth.

3. In a conduit for high tension electric currents, the combination with a pipe or tube, a series of conductors therein, an insulating block with which the ends of said conductors are engaged, a metallic washer, a soft packing between said washer and the insulating block, and a spring engaging the washer, whereby the conductors will be maintained under tension, as and for the purposes set forth.

4. In a conduit for high tension electric currents, the combination with a supporting tube, a conductor therein, an insulating block secured to said conductor, and a spring positioned to impose stress on said block to maintain said conductor under tension, substantially as set forth.

5. In a conduit for high tension electric currents, a supporting tube, conductors therein, and a spring interposed between said tube and both said conductors for maintaining the conductors under tension, substantially as set forth.

6. In a conduit for high tension electric currents, a pair of supporting tubes, a coupling for connecting said tubes, a conductor in each of said tubes, springs for maintaining said conductors under tension within said tubes, and a flexible connection between the adjacent ends of said conductors, substantially as set forth.

7. In a conduit for high tension electric currents, a pair of supporting tubes, a coupling for connecting said tubes, a conductor in each of said tubes, an insulating plug secured to the end of each of said conductors, a spring bearing against said plug to maintain the conductor under tension, and a flexible connection between the adjacent ends of said conductors, substantially as set forth.

8. In a conduit for high tension electric currents, the combination of a pipe or tube comprising a plurality of sections, a conductor in each of said sections, a coupling joining two of the sections, the said coupling being formed of two sections, secured respectively on the adjacent ends of the pipe sections and secured together, and two insulating blocks within said coupling, spaced from each other and from the tube sections, each of said conductors being secured to one of said insulating blocks, and a flexible connection joining the ends of the conductors secured to said blocks, substantially as set forth.

9. In a conduit for high tension electric currents, the combination of a supporting tube, a conductor therein, an insulating block secured to said conductor, and yielding means positioned to impose stress on said block to maintain said conductor under tension, substantially as set forth.

This specification signed and witnessed this 17th day of April 1905.

WILLIAM A. WARREN.

Witnesses:
FRANK L. DYER,
MINA C. MACARTHUR.